३,३५६,५१९
CELLULOSE ETHER COMPOSITION
William C. Chambers, Plaquemine, and Milford Lee, Baton Rouge, La., assignors to The Dow Chemical Company, Midland, Mich., a corporation of Delaware
Filed Feb. 28, 1964, Ser. No. 348,023
1 Claim. (Cl. 106—187)

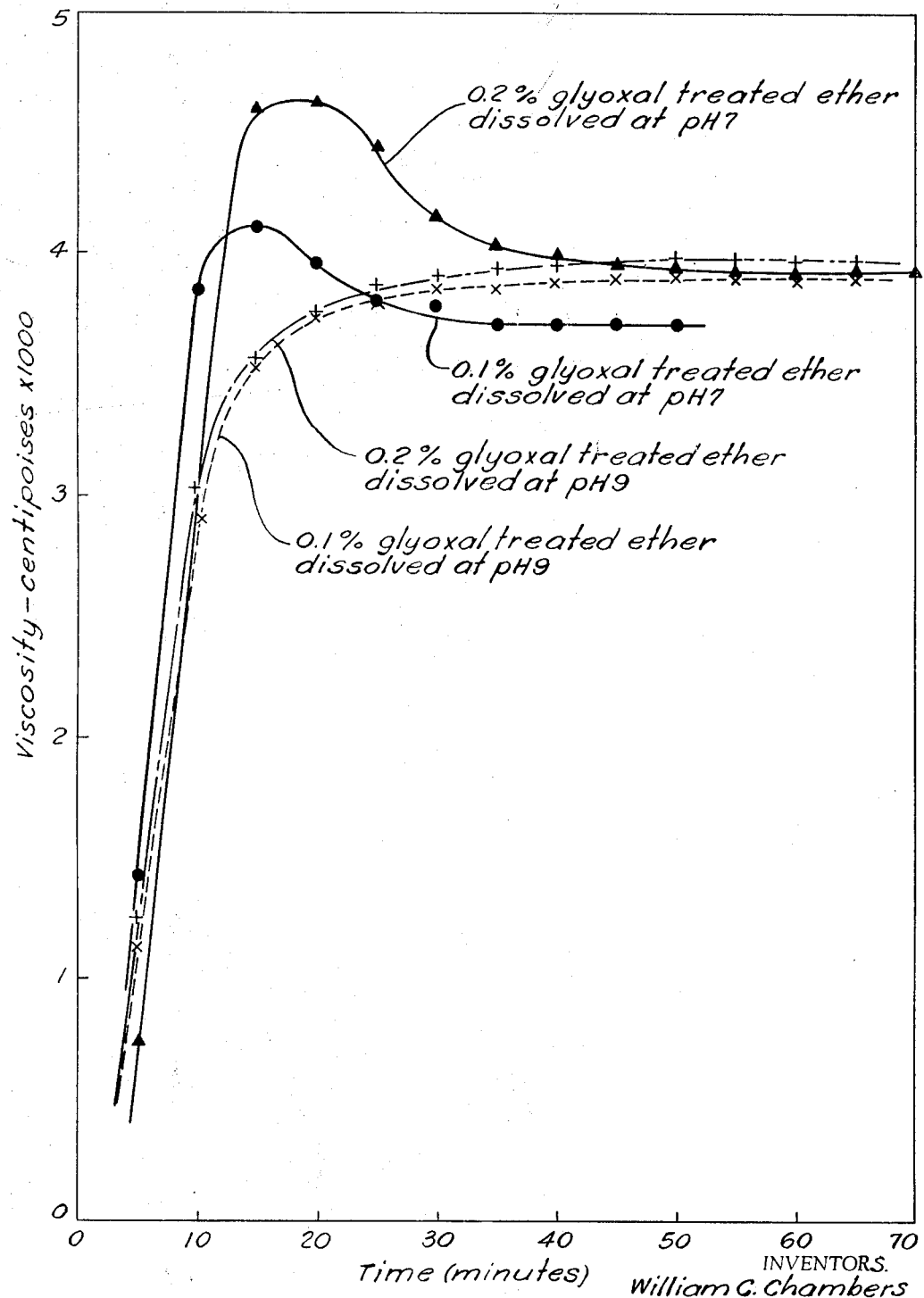

The present invention relates to novel cellulose ether compositions and particularly surface treated cellulose ether compositions modified to achieve improved solution properties.

It is known that the surface treatment of water-soluble cellulose ethers with a cross-linking material such as aldehyde or dialdehyde improves the dispersibility of that ether in water. When mixed with water, ethers without such treatment tend to agglomerate, thereby forming difficultly soluble gels, which interfere with the usefulness of the ethers as dispersants and thickeners for aqueous systems. The surface treated ethers are readily dispersed in aqueous systems, but complete solution of such ethers, as evidenced by the attainment of a stable solution viscosity, may be significantly delayed. As the amount of the surface treating agent applied to the ether is increased, the dispersibility of the resulting product is enhanced, but at the same time the solution rate of the ether is retarded.

A further characteristic of such surface treated ethers is their tendency to manifest a false viscosity immediately after dissolution in water. By this is meant the initial viscosity manifested by the solution gives way to a substantially lower viscosity over a period of time which may take as long as several hours. When the intended purpose of the cellulose ether is that of a thickening agent, such initial false thickening often leads to erroneous results in the utilization of the ethers as thickeners. Even when the phenomenon is understood and taken into account in determining dosage, process control is difficult to achieve.

In view of the foregoing considerations, it would be desirable, and it is an object of the present invention, to provide a novel process and composition whereby surface treated cellulose ethers are more readily dissolved subsequent to dispersion in water. A further and equally important object is to provide surface treated cellulose ether compositions which quickly produce a true viscosity as the ether is dissolved. These, and other objects and benefits as will become apparent hereinafter, are accomplished in the present invention.

The present invention involves the discovery that water-soluble cellulose ethers, having a surface treatment with an aldehydic material to render the ethers more readily dispersible in water, manifest improved solution properties when utilized in conjunction with certain buffering agents. Particularly, a sufficient amount of one or more of such agents is incorporated into an intimate admixture with the surface treated, water-soluble cellulose ethers to produce, when the admixture is dissolved in water, a solution pH within the range of about 7.5 to about 9.5. Within this relatively narrow pH range a surface treated cellulose ether is characterized by an increased solution rate in water. Further the tendency of the surface treated ether to develop false solution viscosities is diminished if not completely obviated. While the above advantages are also obtained at a pH greater than about 9.5, the energy required to disperse the ether in water begins to increase rapidly with further increases in pH.

The invention is applicable to those water-soluble cellulose ethers having an aldehydic surface treatment as described by Menkart et al. in United States Patent 3,072,635 and ethers of like nature described by Jullander in United States Patent 2,879,268. Particularly, the cellulose ethers described in the former patent as being suitable for surface treatment include the various water-soluble and alkali-soluble, non-ionic and ionic ether derivatives of cellulose. Beginning with line 10 in column 2 of this patent are detailed references to such ethers. The Jullander patent also contains teachings of such ethers.

The surface treatment of the cellulose ethers encompassed by the present invention includes the application to the particulate ether of any aldehydic material, preferably a dialdehyde containing less than 6 carbons such as, for example, formaldehyde, and a variety of lower aliphatic dialdehydes such as glyoxal, pyruvaldehyde, malonaldehyde, succinaldehyde, adipaldehyde and the like materials. Excellent results are achieved if the present invention is practiced with water-soluble ether products on which surface treatment has been accomplished by the spraying of the dry particulate cellulose ether with a liquid dispersion of glyoxal, formaldehyde or pyruvaldehyde in an inert solvent. While the surface treatment must be applied to the ethers existing as particulate solids, either powdered or granulated forms are operable.

Having obtained a surface treated, water-soluble cellulose ether, the ether is dry blended in accordance with the invention with an alkali metal or ammonium salt of a weak protonic acid. Typical salts are the alkali metal salts and acid salts of such acids as carbonic, phosphoric, boric, acetic and citric acids. The amount of one or more of such salts added to the ether composition is that sufficient to produce, upon dissolution of the admixture in water, a pH within the range from about 7.5 to about 9.5. While the above-indicated order of treatment, i.e., surface treatment first and then buffering agent, is preferred, the addition of the buffering salts may also take place during or after operations carried out to effect surface treatment of the ether.

The following examples illustrate the mode of carrying out the invention, as the invention is presently understood. It should be understood, however, that specific proportions and reaction conditions utilized therein are not intended as limitations on the invention other than as delineated by the claims.

EXAMPLE 1

A series of water-soluble cellulose ethers including granular methyl cellulose, granular hydroxy-propylmethyl cellulose, and powdered hydroxyethyl cellulose were treated in the following manner. A sample of each ether was charged to an operating ribbon blender wherein it was subjected to a fine spray of glyoxal dispersed in a liquid surface active, polyoxyalkylene glycol ether. A sufficient amount of this mixture was applied to give the ether a surface treatment of 0.1 percent glyoxal and 1 percent of the polyoxyalkylene glycol ether. In a second series of runs, sufficient sodium borate ($Na_2B_4O_7 \cdot 10H_2O$) was blended with the ether during the spraying operation to provide 0.2 percent by weight of the inorganic buffering additament in addition to the surface treatment with glyoxal in polyoxyalkylene glycol ether as described above. Unless otherwise specified, all percentages herein are based on the weight of the dry cellulose ether.

The modified, surface treated cellulose ether compositions were evaluated as to their dispersibility by adding 10 grams of each ether to 300 grams of water at 20° C. and a pH of 7. After allowing the ether to stand in the water for 30 seconds, the mixture was stirred slightly to determine the extent of solids agglomeration. A rating of excellent was given those dispersions having no visible agglomerates. In other words, dispersion of the ether in water resulted in a clear solution visually free of any agglomerates, i.e., occluded and poorly wetter ether solids.

The method used for determining the solution time or the solution rate of the modified ethers involved the following procedure. Nine hundred and eighty grams of distilled water at a pH of 7 was added to a 1,500 milliliter beaker. The water temperature was adjusted to 20° C. An air-operated stirrer provided agitation. One milliliter of n-tributyl phosphate was added to the water as a defoaming agent. Thereafter, 20.0 grams of the surface modified ether to be evaluated was added. The spindle of a Brookfield viscosimeter was then lowered into the resulting dispersion of the ether and readings of the solution viscosity taken every 60 seconds for the first 10 minutes after addition of the ether, agitation of the solution being stopped while the readings were made. Subsequent to the first 10 minutes, the viscosity readings were made at 5 minute intervals until the solution achieved an essentially constant viscosity for at least 3 consecutive readings. This viscosity plateau was assumed to indicate the achievement of complete dissolution of the ether. The results of the dispersibility and solution time determinations are listed in the following table according to the particular water-soluble cellulose ether composition evaluated.

TABLE I

| Cellulose Ether | Dispersibility | | Solution Time (minutes) | |
| --- | --- | --- | --- | --- |
| | Without $Na_2B_4O_7$ | With $Na_2B_4O_7$ | Without Borate | With Borate |
| Methyl cellulose | Excellent | Excellent | 30 | 10 |
| Hydroxypropylmethyl cellulose | do | do | 30 | 10 |
| Hydroxyethyl cellulose | do | do | 60 | 10 |

It will be observed that excellent dispersibility was achieved in all instances and when the surface treated ethers contained a basic buffering agent in accordance with the invention, e.g., the sodium borate hydrate illustrated, the time required to achieve complete solution of the ether was substantially diminished.

EXAMPLE 2

Two aliquots of a water-soluble methyl cellulose ether were sprayed with sufficient glyoxal to provide a glyoxal surface treatment for each of the ether aliquots of 0.1 and 0.2 percent by weight of the ether, respectively. Spraying of the cellulose ether was accomplished as the ether was continuously agitated in a small ribbon blender. Subsequently, the aliquots of surface treated ether were aged for 4 months at ambient room temperatures.

Each of the treated aliquots was evaluated for its solution rate in water at a pH of 7 and again at a pH of 9 in a manner similar to the procedure described in Example 1 for determining solution rates. These rates were determined for solutions made up to contain 2 percent by weight of the ether. A plot of the resulting data is shown in the attached drawing.

It will be observed that the ether solution developed a false viscosity somewhat in proportion to the extent of glyoxal treatment of the dissolved ether. This viscosity lasted for a period of time up to 35 minutes after initial dispersion of the cellulose ether in water at a pH of 7. However, at a solution pH of 9, both of the surface treated ether products follow essentially the same solution rate curve which achieved a maximum viscosity in about 20 minutes and remained at this level.

What is claimed is:

A composition of matter consisting essentially of a water-soluble, particulate cellulose ether having an aldehydic surface treatment to increase the dispersibility of the ether in water and an alkali metal salt of a weak protonic acid in an amount sufficient to maintain an aqueous solution of the ether and said salt in water at a pH within the range from about 7.5 to about 9.5.

References Cited

UNITED STATES PATENTS

| | | | |
| --- | --- | --- | --- |
| 1,775,179 | 9/1930 | Weidig | 106—184 |
| 2,663,989 | 12/1953 | Schlatter et al. | |
| 2,834,777 | 5/1958 | Jullander | 260—232 |
| 2,842,451 | 7/1958 | Grummitt et al. | 260—232 |
| 2,879,268 | 3/1959 | Jullander | 260—232 |
| 3,072,635 | 1/1963 | Menkart et al. | 260—232 |
| 3,108,890 | 10/1963 | Beaver. | |
| 3,297,583 | 1/1967 | Dierichs et al. | 252—363.5 |

OTHER REFERENCES

"Handbook of Chemistry and Physics," Hodgman et al. by Chemical Rubber Pub. Co., 40th ed., 1959, pp. 1721–22.

ALEXANDER H. BRODMERKEL, *Primary Examiner.*

ROBERT F. WHITE, *Examiner.*

J. H. WOO, *Assistant Examiner.*